United States Patent [19] [11] Patent Number: 4,878,002
Heatzig et al. [45] Date of Patent: Oct. 31, 1989

[54] MULTI-AXIS DSP-BASED PARALLEL PROCESSING SERVO CONTROLLER FOR MACHINE TOOLS AND ROBOTS

[75] Inventors: Eric Heatzig, Watertown, Mass.; Alexander Slocum; Debra Thurston-Slocum, both of McLean, Va.

[73] Assignee: Advanced Engineering Systems, Operations & Products, Inc., Concord, N.H.

[21] Appl. No.: 263,503

[22] Filed: Oct. 27, 1988

[51] Int. Cl.⁴ .............................................. G05B 19/42
[52] U.S. Cl. ........................... 318/568.2; 318/568.13; 364/132; 364/148
[58] Field of Search ...................... 318/568.2, 568.13; 364/132, 148

[56] References Cited

U.S. PATENT DOCUMENTS 4,803,613  2/1989  Kametani et al. ................... 364/132
4,809,154  2/1989  Newton ............................... 364/148

Primary Examiner—William M. Shoop, Jr.
Assistant Examiner—Saul M. Bergmann
Attorney, Agent, or Firm—Rines and Rines, Shapiro and Shapiro

[57] ABSTRACT

A multi-axis Digital Signal Processor based servo controller system in which all servo and sensor interface boards are connected to a common backplane bus system enabling inter-board communication, with parallel processing using dual port memory and multiple DSP chips, and with each servo board having access to position data from other axis feedback sensors as well as their own, and a self-tuning control software architecture that uses the hardware architecture high speed to allow it to self-tune control constants to optimize performance.

9 Claims, 5 Drawing Sheets

MULTI-AXIS DSP-BASED PARALLEL PROCESSING SERVO CONTROLLER FOR MACHINE TOOLS AND ROBOTS

The present invention is concerned with DSP (digital signal processor)-based servo controllers for servo controlled positioning of mechanisms, being more particularly directed to such controllers adapted for simultaneous control for two or more axes while achieving servoloop times on the order of tens of microseconds, and for such applications as the positioning of leadscrew or linear electric motor actuated carriages and similar devices with microinch resolution of motion.

The art is replete with single processor servo controllers capable of up to three axis control, but their servo loop time is only on the order of milliseconds. These controllers sometimes use DSP's and although they can be linked together to form a multi-axis control system, they do not have sufficient memory or memory structure and high speed interconnectability that is needed for error-mapping and compensation between several axes. In addition, most of such single axis controller boards can only be interfaced to one feedback sensor and have only one analog voltage output for each intended axis of control. This precludes the use of advanced motor control techniques described in copending U.S. patent application No. 07/263,502 whereby two analog waveforms are output to a rotary or linear DC brushless electric motor to produce torque or force respectively without ripple. In addition, the servo loop times of such systems are typically in excess of one millisecond. Furthermore, presently most machine tool controllers only execute a proportional control algorithm digitally and use an analog lead/lag compensation unit in the motor amplifiers to achieve a hybrid proportional-integral-derivative (PID) control action. This is due to the fact that servo loop times on the order of tens of microseconds are required to implement a PID algorithm in order to make a system respond as fast as a digital/analog hybrid system. However, analog systems are prone to drift with time and cannot be readily self-tuned to keep the machine in optimal running condition.

An object of the present invention is to provide a new and improved DSP-based servo controller that is not subject to any of these prior art disadvantages and others, and, indeed, enables ready multi-axis control, permits easy execution of error-mapping and compensation techniques, enables execution of advanced motor (electric or hydraulic) control techniques, and may have a control algorithm (e.g. PID) loop time on the order of 10 microseconds which allows for the potential to achieve microinch or better accuracy depending on the machine being controlled. This in turn allows the entire control algorithm to be implemented digitally, thus reducing the cost of existing motor amplifiers that contain lead-lag circuitry and increasing system performance by allowing self-tuning algorithms to be implemented to allow the machine to always be in optimal operating state, and to allow the use of more advanced control algorithms (e.g. "Deadbeat," "Fullstate feedback-observer," and/or algorithms containing feedforward elements).

Other and further objects will be explained hereinafter and are more particularly delineated in the appended claims.

In summary, the invention provides a multi-axis DSP-based servo controller system for positioning motor-driven carriages and similar devices in response to multi-axis position-sensing readings made with laser interferometers, optical encoders and other incremental scales, or analog measuring devices (e.g. capacitance probes); the system having, in combination, three types of sensor interface boards consisting of a multi-axis laser interferometer position-sensing reader board, an A and B incremental position sensor reading board (some sensors output two square wave pulses of the same wavelength that are 90° phase shifted, with frequency of output proportional to the speed the object is moving), and an analog-to-digital conversion board for receiving signals from an analog sensor (e.g. capacitance probe), and a plurality of multi-axis DSP based servo control boards, one for each motor associated with each axis, and each of these boards having a dual port memory and a local memory; a multiple bus backplane interconnection such as Intel Corp's Multibus ® (or other suitable bus structure) interconnected with the dual port memory of each of the multi-axis sensor interface and servo boards such as to enable inter-board communication and parallel processing; means for applying the multi-axis position data read by the sensor interface boards (interferometer, A quad B, and/or analog-to-digital) and stored in their dual port memories by way of the Multibus ® (or any other suitable bus structure) backplane to each servo board for storage in each servo board, dual port memory; means for transferring the position data thus stored in each servo board dual port memory to its own local memory; each servo board having servoloop controller DSP means responsive to the position values in its local memory to perform its control loop algorithms in time, on the order of ten microseconds, while updated position data from the sensor interface board dual port memories are transferred into the dual port memory of the servo boards; each servo board having at least one but ideally two or more digital-toanalog (D/A) converter means connected to send output commands from the DSP to motor amplifier means for controlling the corresponding axis motor; and self-turning algorithm means to evaluate system performance and adjust digital control parameters accordingly to allow the controller to be self-tuning to enable the machine tool to always be run in an optimal state. Preferred and best mode embodiments and details are later presented.

The invention will now be described with reference to the accompanying drawings.

Figure 1:
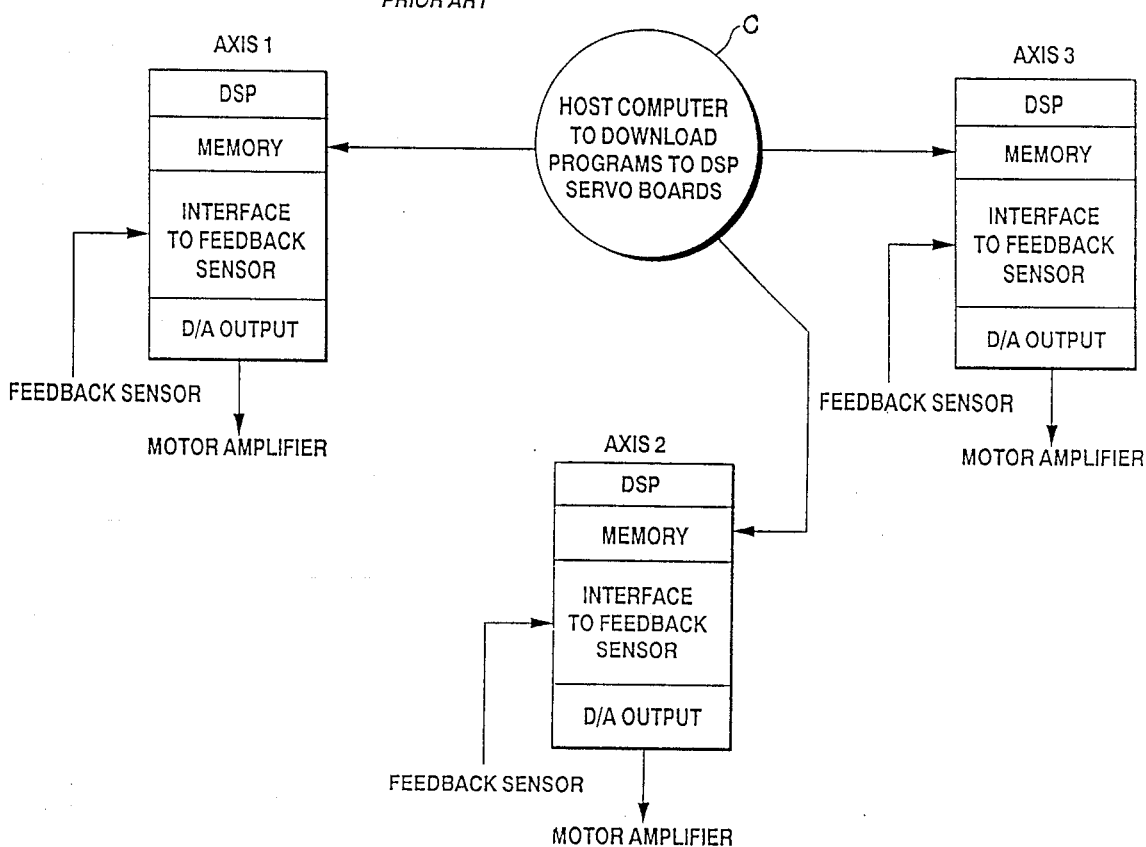
FIGS. 1 and 1A are block diagrams of typical prior art type of DSP based controller systems to provide up to 3-axis control and, as before outlined, subject to serious disadvantages.
Figure 1A:
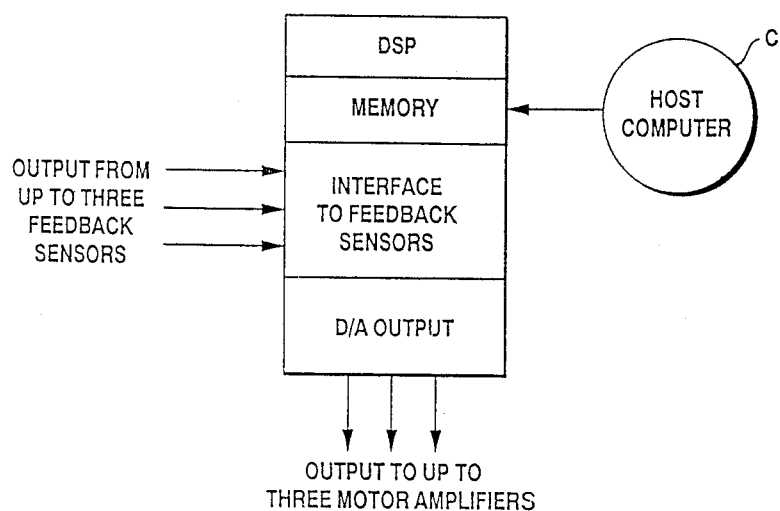

Referring to the prior art, as represented in FIG. 1, three DSPbased single-axis servo controllers are shown for axes 1, 2 and 3, solabelled, receiving in their respective memories, input from a host computer C that downloads programs to the "DSP" servo boards. Position sensors feed back to an interface, and the controller D/A output (digital-to-analog) controls a single motor amplifier (one for each axis). In FIG. 1A, a single DSP board handles all three axes. Both these DSP systems are slow because their designers did not realize the potential for increased performance if the servo systems were made self-tuning and completely digital, which requires 10 microsecond servoloop times; thus they did not optimize their hardware architectures for speed, ease of position data sharing among axes, and provision for large amounts (e.g. on the order of 16 megabytes) of memory needed for mapping errors and providing compensation.

In accordance with the present invention, on the other hand, parallel processing is effected with all servo-boards connected to a common backplane bus system, large amounts of memory provided, and interboard communication is both possible and efficient, thereby allowing for self-tuning and error mapping and compensation to increase system accuracy and performance. Each servo board has access to position data from other axis feedback sensors, allowing ready error-mapping and compensation techniques to be implemented. The system is capable of true parallel processing using dual port memories and multiple DSP chips, and each servo board is provided with multiple (up to six) D/A outputs and up to sixteen 32-bit digital I/O ports, allowing advanced motor control systems to be implemented for control of up to three axes from each servo board. The local memories of each servo board, moreover, may have up to 16 million words of local high-speed memory for storing look-up tables and error maps. The servo board controls, moreover, each controlling one axis, can execute control algorithms (e.g. PID) with loop times on the order of 10 micro seconds, as previously noted.

Figure 2:
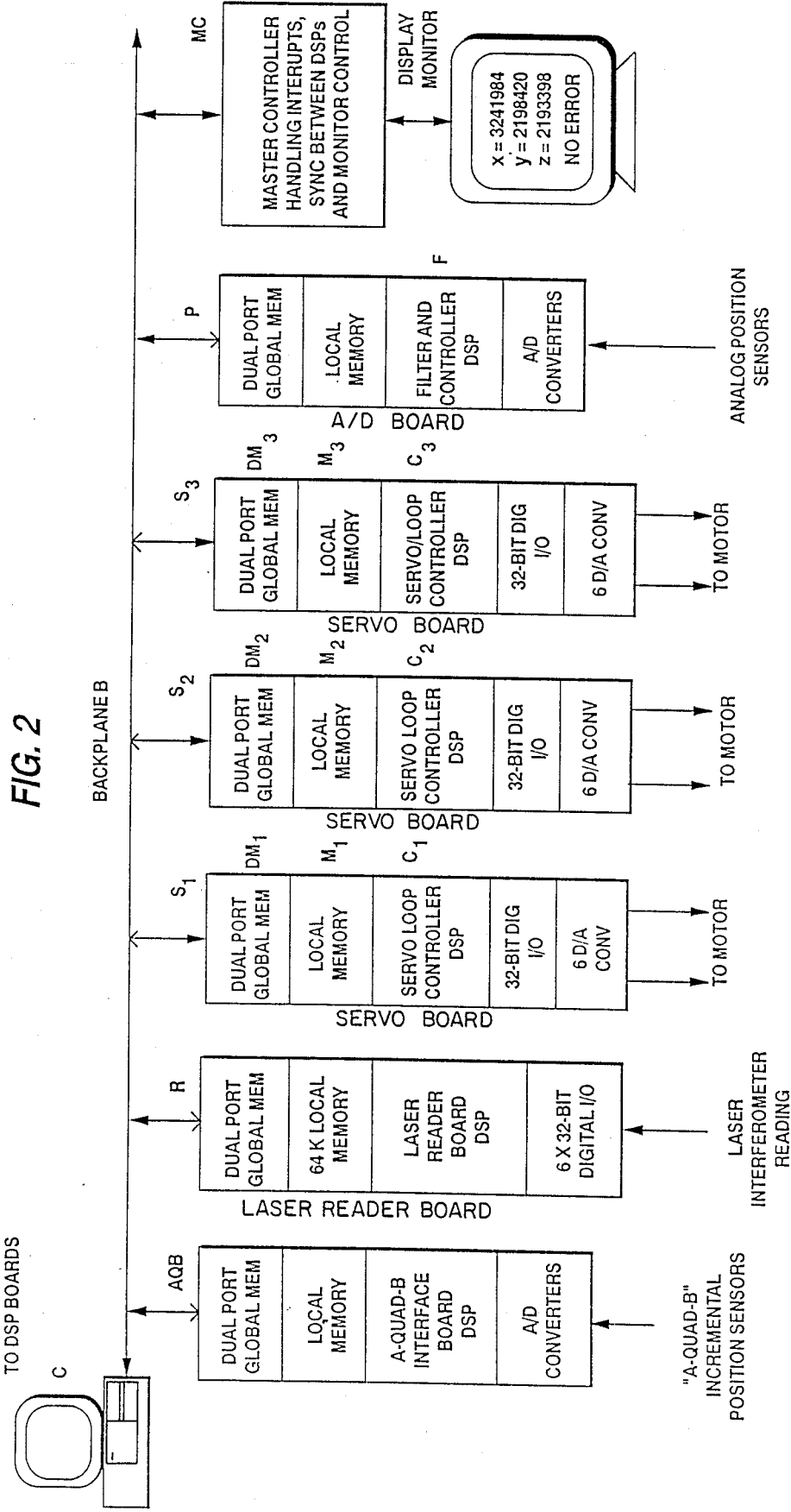
FIG. 2 is a similar diagram of the improved system of the present invention in preferred form.

A preferred implementation for such operation is shown in FIG. 2, illustrated for three axis control, where these servo boards, one for each of the axes, are shown at $S_1$, $S_2$, and $S_3$, each provided with its own dual port global memory $DM_1$, $DM_2$ and $DM_3$, respectively, and local memories $M_1$, $M_2$ and $M_3$, and DSP servo loop controllers $C_1$, $C_2$ and $C_3$, the outputs of which comprise 32-bit digital I/O's so-labelled, and six D/A converter outputs to motor amplifiers, indicated as "TO MOTOR". The dual port memories of all servo boards $S_1$, $S_2$ and $S_3$ are connected in parallel interactively with said Multibus ® (or other suitable bus structure) backplane B which is connected to the host computer C that downloads programs to the DSP boards.

Figure 3:
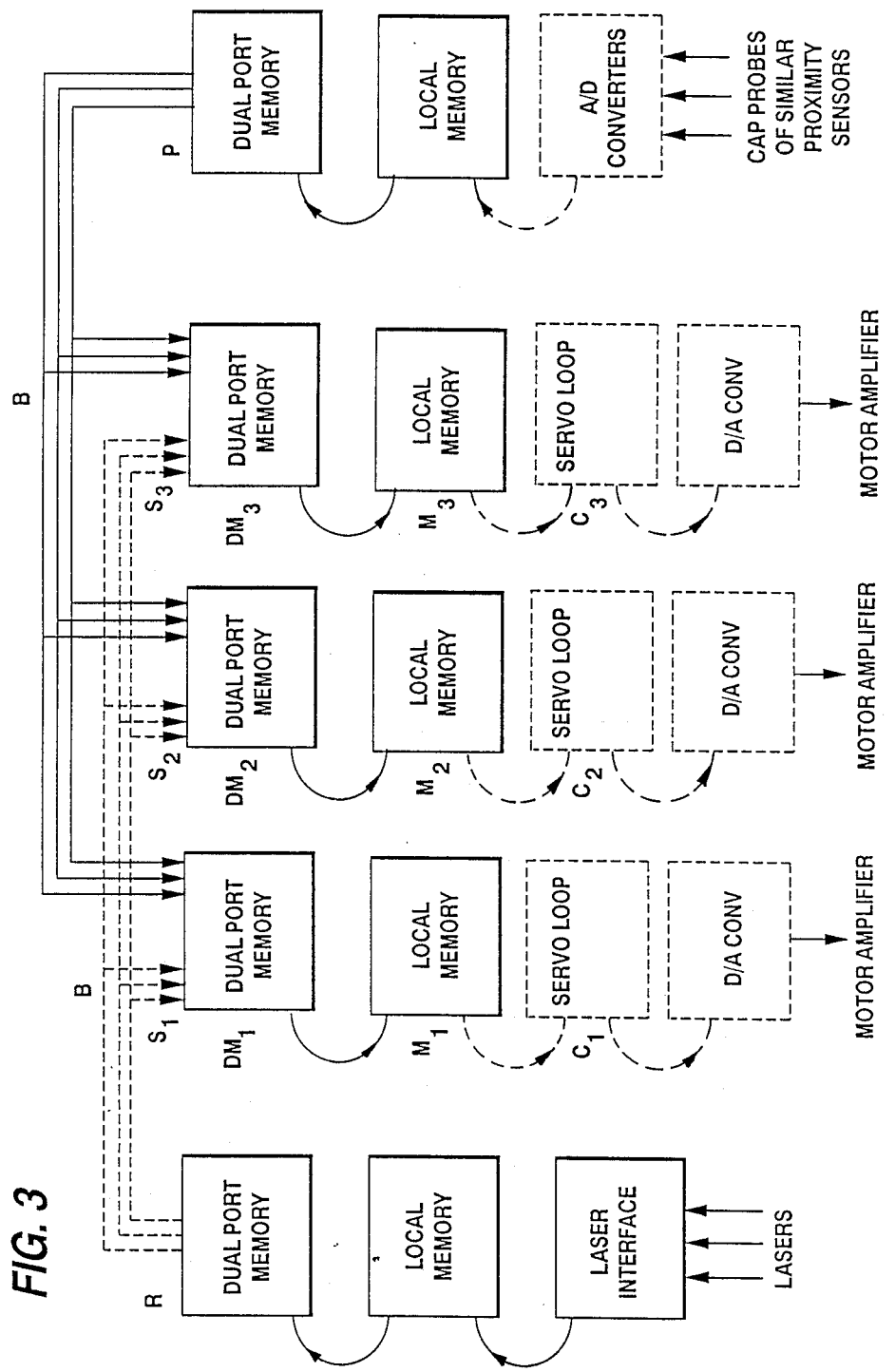
FIG. 3 is a data flow diagram from the system of FIG. 2.

Similarly, the dual port memory of the A quad B board AQB is connected to the said backplane B. This board accepts pairs of square wave pulses (that are 90° out of phase) from incremental motion sensors and transforms them into position values. This allows the user to read sensors such as optical encoders. Laser interferometers or other multi-axis position-sensing elements reading axis orientations are fed through 6×32-bit digital I/O to the DSP of laser reader board R, so-labelled, with storage in a local memory (64k), and thence in the dual port memory. Analog position sensors determining whether the carriage is at the user desired or other desired position or location or how close, apply their signals to A/D converters in the A/D board P, the dual port memory of which also is connected to the said backplane B. Each of these three types of boards can be "plugged in" to a Multibus ® backplane as needed; hence ensuring complete system modularity. A display monitor (far right in FIG. 2) showing x, y, z coordinates, errors, etc. interconnects through a master controller MC handling interrupts, synchronization and monitor control, to the Multibus ® backplane (or similar bus structure) B. The operation of the system of FIG. 2 is illustrated in the data flow chart of FIG. 3 and the timing blocks (Time Block 1, Loop Time, Time Block 2) of FIG. 4, explaining the concept of an exemplary 3-axis parallel processing system with the free feedback signals for the before-mentioned illustrative and preferred laser sensors. Note that, if desired, it would be simple to substitute optical encoders and the A quad B boards for the interferometers and laser reader boards, respectively, although sensor resolution would be lower. During Time Block 1, each servo board $S_1$, $S_2$, $S_3$ transfers position data from the previous time step, from all three axis lasers from its corresponding dual-port memory $DM_1$, $DM_2$, $DM_3$ into its own respective local memory $M_1$, $M_2$, $M_3$. The lasers are read by the laser reader board R as before-mentioned and the new positions are calculated and stored in the dual port memory of the laser reader board for use in the next time step. The outputs of the A/D converters of the analog-to-digital conversion board P represent small error motions or initial startup position of the machines axes as measured by analog sensors such as capacitance probes. These outputs are digitally filtered at F, FIG. 2, and the results stored in local memory and then transferred to the dual port memory. The data is transferred to other board dual port memories $DM_1$, $DM_2$ and $DM_3$ of each of the respective servo boards $S_1$, $S_2$ and $S_3$, FIG. 3, by way of the said backplane B.

Figure 4:
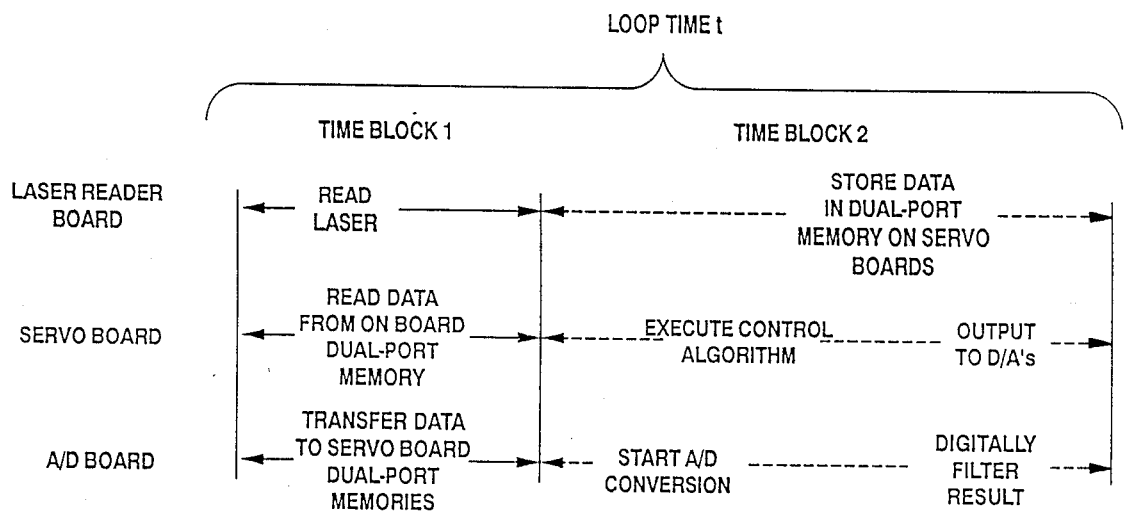
FIG. 4 is a timing diagram of the operation of the systems of FIGS. 2 and 3.

During the Time Block 2, FIG. 4, the servo board controllers $C_1$, $C_2$, $C_3$ begin their respective control loop algorithm operation using the position values in their respective local memories $M_1$, $M_2$ and $M_3$. The updated positions in the dual port memory of the laser reader card R are transferred by way of bus B (shown dotted) into the dual port memories $DM_1$, $DM_2$ and $DM_3$ of the servo boards $S_1$, $S_2$ and $S_3$. The output commands from the servo control loops $C_1$, $C_2$ and $C_3$, which may contain corrections from stored maps of machine tool error data or maps of motor Back Emf, are outputted to their respective D/A converters connected to the respective conventional motor amplifiers or amplifiers that control the voltage on individual motor windings. Once the A/D conversion results are stored in the A/D board local memory, the converters are triggered to begin new conversions, and digital filtering of the stored results begins. The cycle then repeats.

As previously pointed out, unlike prior art systems, since each servo board $S_1$, $S_2$ and $S_3$ accesses the position data from the other axis feedback sensors as well as their own error-mapping and compensation are readily implemented in well-known fashion.

Figure 5:
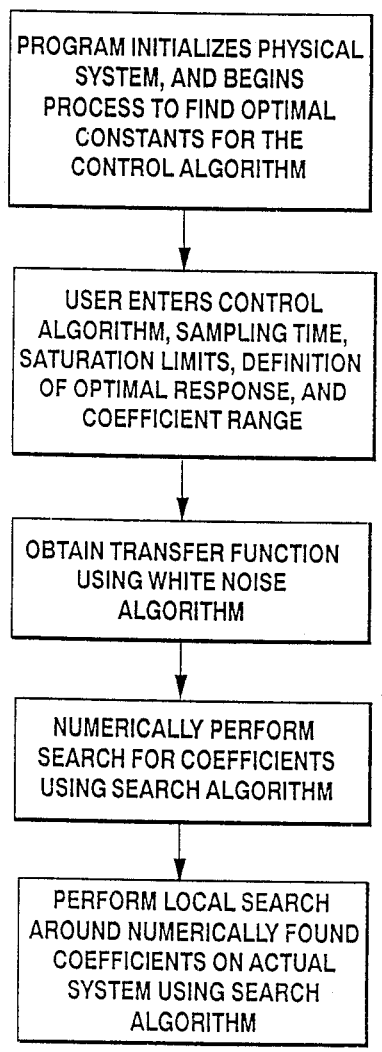
FIG. 5 is a flow chart of the overall operation of the architecture shown in FIG. 2 in conjunction with the self-tuning algorithm.
Figure 6:
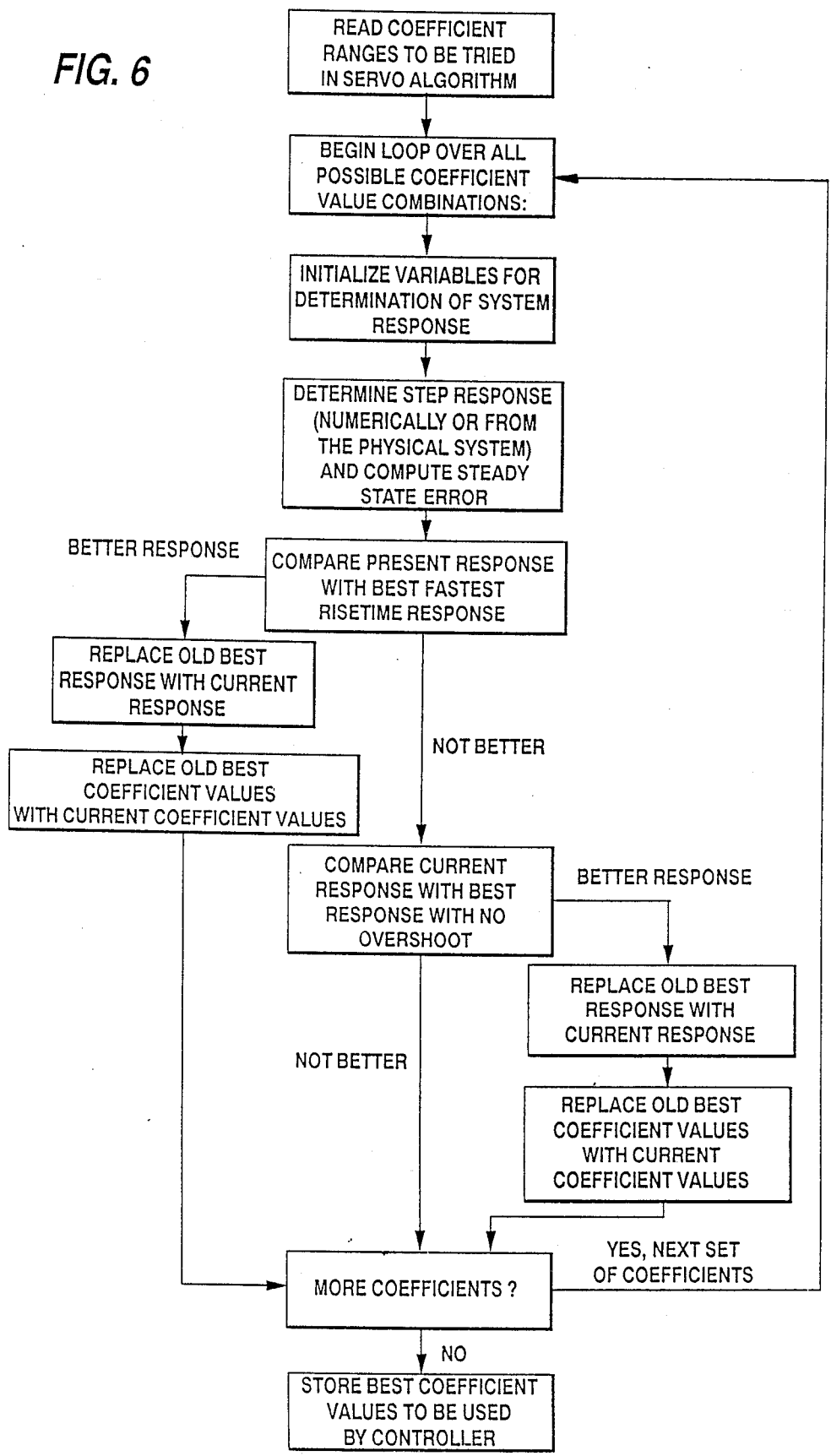
FIG. 6 is a flow chart showing the logic of the self-tuning algorithm.

The self-tuning algorithm operates as shown in the flowcharts in FIGS. 5 and 6. The tuning algorithm will work with any type of control algorithm used (e.g. PID or "fullstate feedback with observer"). The user need only enter the range of constants to be considered, the controller difference equation, the sampling rate, the saturation limits, and definition of "optimal response". The default for optimal response in the algorithm will choose one set of constants for minimal step response time with a defined maximum allowable overshoot and a set of constants of minimal step response time with a no allowable overshoot.

After the user enters this startup information and tells the program to begin, the program sends white noise (of varying amplitude for non-linear systems) to the mechanical system and observes its response. Then a standard algorithm used by those skilled in the art of signal processing is used to obtain the transfer function for the system from the system response to the white noise, FIG. 5 For non-linear systems, the transfer function will also be a function of amplitude. With this exact transfer function(s) for the mechanical system that the DSP controller is connected to, the program then performs a numerical search for the ideal controller coefficients (for each of the transfer functions should there be more than one), using the highspeed DSP. The search is done numerically in the DSP by the program trying each possible combination of coefficient values when numerically determining the performance of the system, using the transfer function(s) obtained earlier. Each response in then (FIG. 6) compared to two stored responses. One stored response is the fastest risetime response found that has minimal overshoot (the amount of allowable overshoot is entered by the user). The second stored response is the fastest response with no overshoot. If the current response is better than either of the two stored responses it will replace the respective response as the best response. The values of the coefficients are then stored as the "optimal ones to use". Since the search is done numerically, it can proceed at several orders of magnitude faster than if the search were done manually.

Once the ideal constants are found, then the program tries them out on the actual physical system. A small scale search is done on the physical system around the numerically found constants to make sure that the constants found are indeed the best ones. This entire process is essentially transparent to the user; thus servo design is made as easy as pushing a button. Furthermore, the program can be instructed to periodically perform a search around the coefficients used with the physical system, to ensure that optimal coefficients are always being used. This helps compensate for machine wear and component aging. In contrast, companies currently maintain staffs of technicians to go to customer's plants and re-tune machine tool servo systems by hand. Note that most current machine tool controllers do not have the capability to merely add this algorithm, because they do not have sufficient speed and processing power to obtain the transfer function and rapidly do the numerical search. They could, however, skip the large numerical simulation search and do a narrower search on the physical system itself from the start. Hence, most effective execution of the algorithm requires an integrated software/hardware design. Therefore this integrated self-tuning system can greatly increase the performance of a machine.

Further modifications will also occur to those skilled in the art, all such being considered to fall within the spirit and scope of the invention as defined in the appended claims.

What is claimed is:

1. A multi-axis DSP-based servo controller system for positioning motor-driven carriages and similar devices in response to multi-axis position-sensing readings as by optical encoders, laser interferometers, and analog position sensors, the system having, in combination, three types of sensor interface boards consisting of an A quad B incremental position sensor reading board, a multi-axis positioning-sensing reader board, an analog-to-digital (A/D) conversion board, and a plurality of multi-axis DSP based servo boards for executing digital control algorithms and outputting analog control voltages, one DSP servo board for each motor associated with one axis, and each board having a dual port memory and a local memory; a multiple bus backplane interconnected with the dual port memory of each of the sensor interface boards such as to enable inter-board communication and parallel processing; means for applying the multi-axis position data read by the A quad B incremental position sensor reader board and stored in its dual port memory by way of the bus backplane to each servo board for storage in each servo board dual port memory; means for transferring the position data thus stored in each servo board dual port memory to its own local memory; means for feeding the analog position sensed information of the A/D board stored in its local and dual port memory from the latter by way of the bus backplane for storage in each servo board dual port memory; each servo board having servoloop controller DSP means responsive to the position values in its local memory to perform its control loop algorithm while up-dated position data in the positionsensing board dual port memory is transferred into the dual port memory of the servo board; each servo board having digital-to-analog (D/A) converter means connected to receive output commands from its servo-loop controllers and in turn connected to motor amplifiers means for controlling the corresponding axis motor; each servo board being provided with a self-turning algorithm to find optimal control constants for a physical system connected to the controller.

2. A system as claimed in claim 1 and in which means is provided for connecting said bus backplane to host computer means to download programs to the DSP servo controller boards.

3. A system as claimed in claim 1 and in which motor controller means for handling interrupts and synchronization interconnects said bus backplane and display monitor means.

4. A system as claimed in claim 1 and in which each board dual port memory has access to position data from the other axis sensing, permitting the implementation of error-mapping and compensation techniques.

5. A system as claimed in claim 1 and in which each servo board D/A output means comprises multiple D/A outputs and multiple digital I/O ports to permit use of motor control systems requiring such.

6. A system as claimed in claim 1 and in which each servo board local memory is of sufficiently high speed and size to enable storing look-up tables and error maps, as well.

7. A system as claimed in claim 5 and in which the said multiple D/A outputs may be up to six and the multiple I/O ports, up to sixteen 32-bit digital ports.

8. A system as claimed in claim 1 in which an algorithm determines the response of the mechanical system and adjusts the control algorithm constants to automatically optimize performance as defined by the user.

9. A multi-axis Digital Signal Processor-based servo controller system having a plurality of multi-axis servo and sensor interface boards; means for connecting all the servo and sensor interface boards to a common backplane bus system, enabling inter-board communications; means for providing parallel processing using dual port memory and multiple DSP chips in each board; means for enabling each servo board to access position data from other axis feedback sensors as well as their own; and self-tuning control software architecture implementing the said system at high speed to allow it to self-tune control constants for optimizing performance.

* * * * *